United States Patent [19]

Pugh et al.

[11] Patent Number: 5,134,647
[45] Date of Patent: Jul. 28, 1992

[54] AUTOMATIC VOICE/DATA MESSAGING ENHANCEMENTS

[75] Inventors: Joel A. Pugh, Dallas; Robert E. Nimon, Arlington, both of Tex.

[73] Assignee: Messager Partners, Dallas, Tex.

[21] Appl. No.: 495,469

[22] Filed: Mar. 19, 1990

[51] Int. Cl.⁵ .................. H04M 3/50; H04M 7/06
[52] U.S. Cl. ......................... 379/88; 379/89; 379/212; 379/214; 379/230; 370/61
[58] Field of Search ............ 379/89, 88, 67, 212, 379/207, 214, 230; 370/61

[56] References Cited

U.S. PATENT DOCUMENTS

| | | | |
|---|---|---|---|
| 4,790,003 | 12/1988 | Kepley et al. | 379/88 |
| 4,908,850 | 3/1990 | Masson et al. | 379/88 |
| 4,932,042 | 6/1990 | Baral et al. | 379/67 |
| 4,959,855 | 9/1990 | Daudelin | 379/213 |
| 4,972,461 | 11/1990 | Brown et al. | 379/67 |

OTHER PUBLICATIONS

"Conversant 1 Voice System: Architecture and Applications", R. J. Perdue et al., *AT&T Tech. Journal,* Sep.-/Oct. 1986, vol. 65, No. 5, pp. 34–47.

*Primary Examiner*—Thomas W. Brown

[57] ABSTRACT

A multi-node telephone network having at least caller-controlled interfaces for providing automatic voice messaging. A first caller-controlled interface unit is preferably located in a trunk or line between the calling station and a first switch for providing intercept and redirect functions associated with automatic voice messaging. The first switch is connected to a second switch via one or more digital communication links. A second caller-controlled interface unit is located in one of the digital communication links for providing intercept and redirect functions associated with automatic voice messaging. According to the invention, each of the interface units includes arbitration control circuits responsive to predetermined signaling to determine which of the interface units will provide the intercept and redirect functions upon call initiation to the called station by a caller at the calling station. The predetermined signaling is preferably provided in a common channel signaling No. 7 (SS7) protocol.

8 Claims, 2 Drawing Sheets

AUTOMATIC VOICE/DATA MESSAGING ENHANCEMENTS

TECHNICAL FIELD

The present invention relates to voice and/or data message storage and forward methods and systems and more particularly to automatic voice/data messaging improvements and enhancements for use in connection with a digital telephone network.

BACKGROUND OF THE INVENTION

It is known in the prior art to carry telephone calls between local telephone operating companies through the AT&T network or through one or more independent inter-exchange carriers such as MCI or Sprint. The local telephone operating companies operate within a so-called local access and transport area (LATA). When a long distance call is dialed, the call is usually transmitted through an operating company central office to a point of termination in the originating LATA at which it is picked up by the inter-exchange carrier and passed by that carrier on to a termination point in a distant LATA. Upon reaching the destination LATA, the call is then transferred by the inter-exchange carrier to the local operating company central office within that LATA for ultimate connection to the original called station therein. Typically, the termination points of each LATA include suitable switching circuits, e.g., an access tandem, that are interconnected by a digital serial link. Such digital links are also presently used to interconnect virtually all central offices as well as to interconnect operating company switching networks to one or more cell site control switches of a mobile telephone network.

It is also known in the prior art to provide "automatic voice messaging" where, upon the occurrence of a busy/ring-no-answer condition at a called station, the user of the calling station can be connected to a voice message facility for recording a voice message for subsequent delivery to the called station. Automatic voice messaging has not heretofore been compatible with telephone networks using digital signaling techniques.

It would therefore be desirable to provide automatic voice messaging in a telephone system having various types of switching circuits that are interconnected via digital serial links.

BRIEF SUMMARY OF THE INVENTION

It is an object of the invention to provide multiple automatic voice and/or data messaging interfaces in a digital network environment wherein each interface has the capability to determine if it will exercise the intercept of a call-in-progress to the exclusion of one or more of the other interfaces in the network.

It is another object to use such in-band and out-of-band signaling techniques to determine if an individual interface located in a multiple interface environment exercises the intercept of a call-in-progress to the exclusion of one or more of the other interfaces in the network.

It is a further object of the invention to describe an intercept and redirect apparatus for caller-controlled automatic voice and/or data messaging wherein multiple channels of a communications link are used to establish the necessary connection paths for the various components of the interface.

It is yet another object of the present invention to provide an apparatus and method for facsimile (fax) storage and forward.

These and other objects of the invention are achieved in a preferred embodiment of the invention wherein multiple automatic voice messaging interfaces or systems are provided for use in a telephone network having a calling station connectable to a first switch and a called station connectable to a second switch, with the first and second switches connected by a digital communication link. Each voice messaging system preferably comprises an interface, a detection circuit, speech circuit and a control arrangement. One or more of the systems includes a host computer for storing voice messages.

A first caller-controlled interface unit is located in a trunk or line between the calling station and the first switch for providing intercept and redirect functions associated with automatic voice messaging. A second caller-controlled interface unit is located in the digital communication link for providing intercept and redirect functions associated with automatic voice messaging. According to the invention, each of the interface units includes a control arrangement responsive to predetermined signaling to determine which of the interface units will provide the intercept and redirect functions upon call initiation to the called station by a caller at the calling station. The predetermined signaling is preferably provided in a common channel signaling No. 7 (SS7) protocol.

In an alternate embodiment, an apparatus is provided for controlling receipt and delivery of voice messages over a telephone system having a host computer connectable to at least one calling station and a called station via a switch, the calling station connected to the switch by a digital communication link having at least first and second multiplexed channels dedicated to the calling station. Preferably the calling station is an ISDN-type telephone or the like in which multiple voice and/or data channels are connected between the telephone set and the switch. The apparatus preferably comprises an interface for monitoring call progress signals in the first channel of the digital communication link upon call initiation to the called station by a caller at the calling station, a detection circuit connected to the interface for detecting receipt, during call progress, of a predetermined code from the calling station indicating that the caller desires to leave a voice message for the called station at the caller's expense, and a control arrangement connected to the detection circuit. The control arrangement serves to connect the calling station to the switch and the host computer via the second channel of the digital communication link upon detection of the predetermined code to enable the caller to record, at the host computer, a message for the called station.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
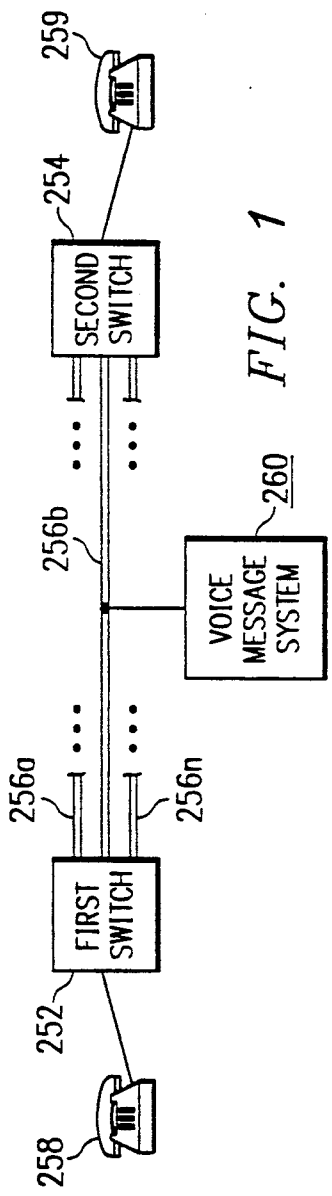
FIG. 1 is a block diagram of a digital telephone network in which an automatic voice messaging system is preferably incorporated.

Referring now to FIG. 1, a block diagram is shown of a generic digital telephone network 250 in which an automatic voice message system is advantageously provided according to the teachings of U.S. Pat. No. 5,036,533. The telephone network generally includes a first switch 252, a second switch 254, and a plurality of digital communications links interconnecting the first and second switches 252 and 254 and designated by the reference numerals 256a–n. At least one digital link 256 is preferably a high speed (1.544 MHz) T-1 span over which conventional in-band signaling is provided in a serial fashion; of course, other higher speed links as DS/3 can be used. Link 256, alternatively, is a high speed digital serial link over which digital signals are provided using out-of-band signaling with other communications protocols, such as X.25 or common channel signaling (SS7).

For purposes of generalization, FIG. 1 shows a calling station 258 connected (or connectable to via a central office or the like) to the first switch 252 and a called station 259 connected (or connectable) to the second switch 254. For the remainder of the discussion, it is assumed that a call to the called station 259 is initiated by a caller at the calling station 258. An automatic voice messaging system 260 is placed across or in a digital link 256 for enabling receipt and delivery of voice messages under the control and at the expense of the caller at the calling station 258.

Without limiting the foregoing, the first and second switches 252 and 254 are access tandems located at termination points between two LATAs. Alternatively, the first switch 252 is an access tandem and the second switch 254 is a cellular tandem or cell site controller for a mobile telephone system. In this configuration, the network 250 is a cellular telephone network. The first switch 252 may be an operating company central office while the second switch 254 is an access tandem. The first and second switches can interconnect two central offices. If the calling station is an Integrated Services Digital Network ("ISDN")-type station, the first switch 252 is a multiplex circuit in the station itself, and the second switch 254 is a central office.

Figure 2:
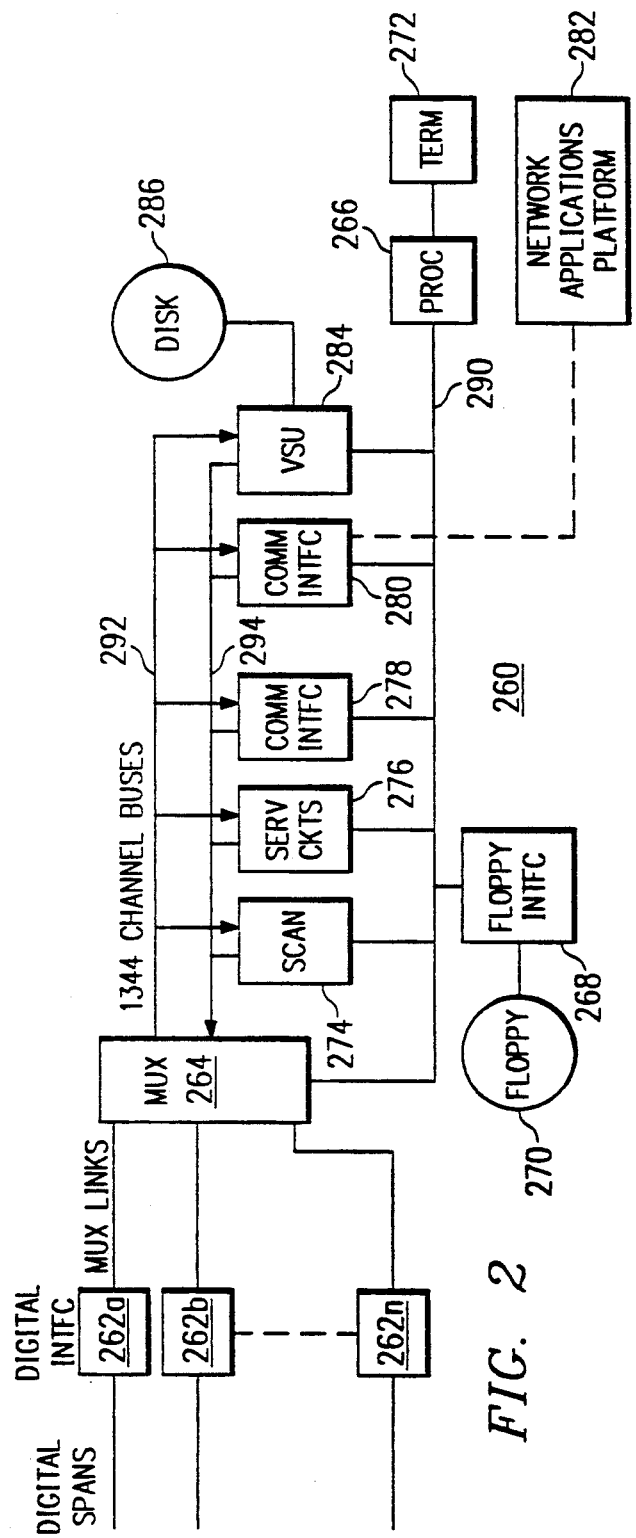
FIG. 2 is a detailed block diagram of the preferred embodiment of the automatic voice messaging system of FIG. 1.

Referring now to FIG. 2, a detailed block diagram is shown of the preferred embodiment of a digital caller-controlled automatic voice and/or data message system 260 for use in a digital network environment. System 260 preferably includes an interface including a plurality of interface circuits 262a–n each connected to a multiplexer 264. The multiplexer includes a control bus connected to a control arrangement comprising a processor 266, storage interface 268, storage device 270 and input/output device 272. The processor is controlled in a conventional manner by suitable application programs stored in the storage device 270. Input/output device is used to modify the system operation by entering suitable program commands to the control arrangement.

The system 260 further includes a number of circuits for facilitating the intercept, prompting and redirect functions associated with the automatic voice messaging service. A scanner circuit 274 is provided to identify Feature Group D supervision or other similar information depending on the type of signaling used. A service circuit 276 includes all of the necessary call progress (busy/ring-no-answer) detection circuits, speech generation circuits, and service acceptance (e.g., DTMF) detection circuits. The service circuit 276 also preferably includes appropriate circuitry for capturing ANI, DNI and billing information. A first communication interface 278 is provided to receive, interpret, format and transmit SS7 messages as will be described in more detail below. The system preferably also includes a second communication interface 280 optionally connected to a host computer or a network applications platform 282. The platform 282 includes a billing computer and other appropriate devices for transaction processing and accounting purposes. The system 260 advantageously includes its own dedicated voice storage unit 284 for storing voice messages. A disk storage 286 is connected to the voice storage unit 284. The voice message storage may take place either in the voice storage unit or in the network applications platform, as is appropriate, to facilitate subsequent delivery.

Each of the circuits 274, 276, 278, 280 and 284 are connected to the processor 266 via the control bus 290. Input/output channel buses 292 and 294 also interconnect these circuits to the multiplexer of the interface. Preferably, the interface includes twenty-eight (28) T-1 interface circuits, each of which is connected to two digital links. Each T-1 interface circuit includes first and second T-1 interface circuits 295 and 297, with the first interface circuit 295 connected to one of the digital links and the second interface circuit 297 connected to the other digital link. The first and second digital links are thus connectable to bypass their respective interface circuit if the first and second T-1 interfaces are interconnected by means of the switch 298. Given this architecture, i.e., with 28 T-1 spans each carrying twenty-four (24) channels, the buses 292 and 294 service 1344 channels.

In operation, the scanner 274, service circuit 276 and/or communications interface 278 monitor the received signaling to determine the state of the call progress. Of course, the actual circuit used depends on the type of signaling. If an SS7 protocol is used, communications interface 278 monitors the line. If Feature Group D signaling is used, the Feature Group D information is collected in and processed by service circuit 276; other types of signaling are collected and processed by scanner 274. When call processing is required due to a busy or ring/no answer condition, the processor 266 activates the service circuits 276 to thereby issue the prompt offering and monitor the line for acceptance of the service. Processor 266 also controls the circuit 276 to capture ANI, DNI and billing information. If the service is accepted, the service circuit 276 notifies the processor 266, which then controls the service circuit to issue appropriate prompts to the caller to instruct the caller to begin recording the message. The message is then recorded by the voice storage unit 284, and the processor controls the service circuit 276 to transfer the ANI, DNI, and billing information to the network applications platform 282. Although not meant to be limiting, preferably voice messages are stored in the voice storage unit 284 or its associated disk storage, while ANI, billing and other management information resides in the network applications platform 282.

For message delivery, the network applications platform 282 ships the message routing information (i.e., the ANI, etc.) back to the voice storage unit 284, and the processor 266 then locates an open channel on a link for outdialing to the original called station. The service circuit then dials the call. When the call is placed, the scanner 274 watches the call states for on-hook/off-hook detection. If off-hook is detected, the service circuit 276 issues a prompt announcing the message which is then delivered by the voice storage unit 284. It is also possible to have the voice storage unit 284 pass a "packet" of data downstream to a platform 282 in a destination delivery area. When the message is delivered, the processor 266 notifies the network applications platform and the packet is deleted.

If desired, the system 260 is connectable to a remote host computer via a dedicated communications interface which in turn is connected to the remote host via an RS-232 link or the like. This enables messages to be transferred to another location for the subsequent outdial attempts. As an alternate embodiment, the network applications platform 282 is set up to control billing and delivery attempts while the remote host issues the prompt announcing the message and other voice functions. The remote host can alternatively retain all billing information with the voice messager for a short time; and then passes off all such information (e.g., after the first delivery attempt) to the platform 282 for further delivery attempt. It is also possible to have the voice storage unit 284 pass a "packet" (comprising the voice message and billing information) downstream to a platform 282 in a destination delivery area (i.e., a destination LATA).

Figure 3:
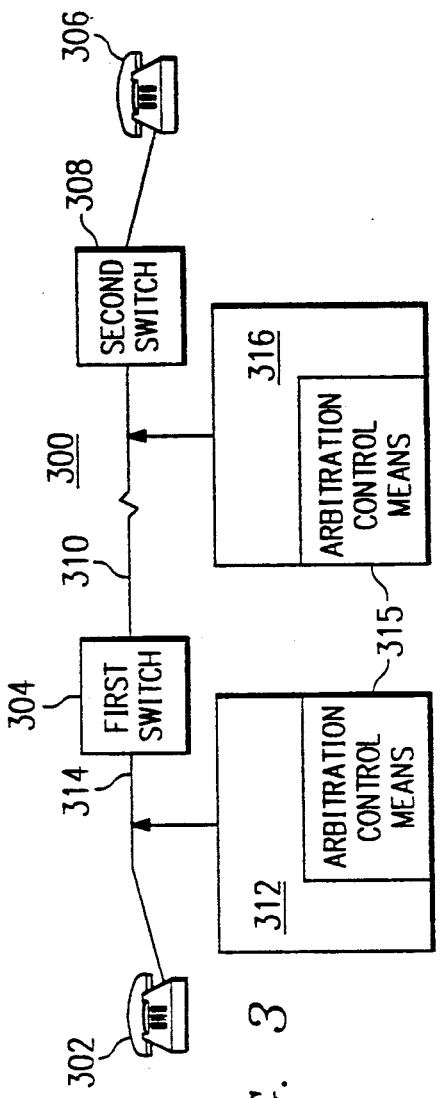
FIG. 3 is a block diagram of a multi-node digital telephone network having multiple automatic voice messaging interfaces according to the teachings of the present invention.

Referring now to FIG. 3, a block diagram is shown of a multi-node telephone network wherein another feature of the present invention is advantageously provided. As seen in FIG. 3, the telephone network 300 includes a calling station 302 connectable to a first switch 304 and a called station 306 connectable to a second switch 308, with the first and second switches 304 and 308 connected by digital communication link 310 as previously described. According to the invention, a first caller-controlled interface unit 312 is provided in a trunk 314 between the calling station 302 and the first switch 304 for providing intercept and redirect functions associated with automatic voice messaging. The interface unit is of the type generally described in U.S. Pat. No. 4,825,460. A second caller-controlled interface unit 316 is also preferably provided in the digital communication link 310 also for providing intercept and redirect functions associated with automatic voice messaging. The unit 316 is preferably of the type described above with respect to FIG. 2.

Although not shown in detail, it should also be appreciated that the network 300 typically includes other nodes between which are located similar types of interface units for providing automatic voice messaging. As previously described, each of the interface units includes a control arrangement for controlling the various intercept, prompting and redirect functions associated with the caller-controlled automatic voice messaging service. According to another feature of the present invention, each of the control arrangements is also responsive to predetermined signaling on the trunk and/or digital communication link during call progress to determine which interface unit will provide the intercept and redirect functions vis-a-vis the other unit(s) in the network. In particular, each interface includes an arbitration control arrangement 315 for this purpose. The predetermined signaling is preferably, but not by way of limitation, provided as part of a common channel signaling No. 7 (SS7) protocol, or a combination of the SS7 protocol and other in-band signaling techniques.

The SS7 protocol contains many protocol layers that are used for logical connection and the transportation of digital messages that control call setup, maintenance and administration. A complete end-to-end basic call setup using SS7 signalling involving two exchanges begins when the originating exchange detects an "off-hook" and collects destination information from the caller. The originating exchange selects an available circuit to the destination exchange, formats an Initial Address Message (IAM) and sends it to the destination exchange. The originating exchange then completes a transmission path from the caller to the selected destination exchange circuit. The destination exchange receives and analyzes the IAM, determines whether the called station specified in the IAM is on-hook. If so, the destination exchange begins ringing the called station and applies an "awaiting answer indication" (ringing) over the transmission path to the originating exchange. The destination exchange then formats and sends an Address Complete Message (ACM) to the originating exchange. If the called party goes off-hook, the destination exchange formats and sends an Answer Message (ANM) to the originating exchange and completes the transmission path between the originating exchange to the called party.

If the call involves other exchanges between the originator and the destination, these intermediates act primarily as transfer points. When an intermediate receives an IAM, it selects a circuit to the next exchange, forwards the IAM with the new circuit identity, and completes a transmission path between the incoming and outgoing circuits. When the intermediate receives an ACM or ANM, it simply relays it in the appropriate direction.

When the called party is busy, the destination exchange detects the busy condition and returns an Unsuccessful Backward Message (UBM) and no transmission path to the origination is completed. As the UBM flows to the originating exchange, the intermediates relay it and release any transmission paths they have associated with the call.

The intercept function required in the automatic voice message service is compatible with the SS7 protocol. In network nodes using SS7, originating and intermediate nodes include a call progress detector as described above in FIG. 2 for determining ring/no answer. To detect busy, the SS7 interface circuit of FIG. 2 detects the UBM, alerts the calling party of the busy condition and conditionally intercepts the call. Interception at an intermediate node is accomplished by the intermediate node not relaying the UBM received from a downstream node. The intermediate exchange then uses the transmission path established to communicate the busy condition and offer intercept. Only if the user then declined the service would the intermediate exchange then relay the UBM. Alternatively, the intermediate node could hold onto the circuit until the call is terminated by the caller. Therefore, after negotiation with the caller concerning the service offering, the intermediate exchange waits for a release message from the originating exchange.

According to the invention, the SS7 protocol formats data in the IAM or other suitable messages for enabling the various interface devices to arbitrate which of the devices exercises the intercept. For example, the IAM message can include an "intercept allowed" parameter. The first node to accept responsibility for any intercept on the call would have the ability to change the parameter to "intercept not allowed" and thus all downstream nodes would not even attempt to intercept. As previously described, the exchange that accepts responsibility for intercept can then offer the service. If the service is accepted, the call is cleared in the direction of the called party.

The arbitration control 315 shown in FIG. 3 is utilized to implement the interface device arbitration feature of the present invention. The arbitration control 315 corresponds to the communications interface 278 of FIG. 2 for SS7 protocols, alternatively as service circuit 276 for MF or DTMF protocols. The interconnection with associated components and function of the interface 278, and hence the control 315, is previously described with reference to FIG. 2. In an alternative embodiment, the control 315 is implemented in a caller-controlled interface unit 312 of the type described in U.S. Pat. No. 4,825,460. An analog interface unit of this type nonetheless includes a microprocessor and modem which function digitally for FSK signaling or limited ISDN information transfer and is easily adaptable for use in a digital link. The foregoing is alternatively capable of transmitting DTMF or MF signals to perform arbitration.

Figure 4:
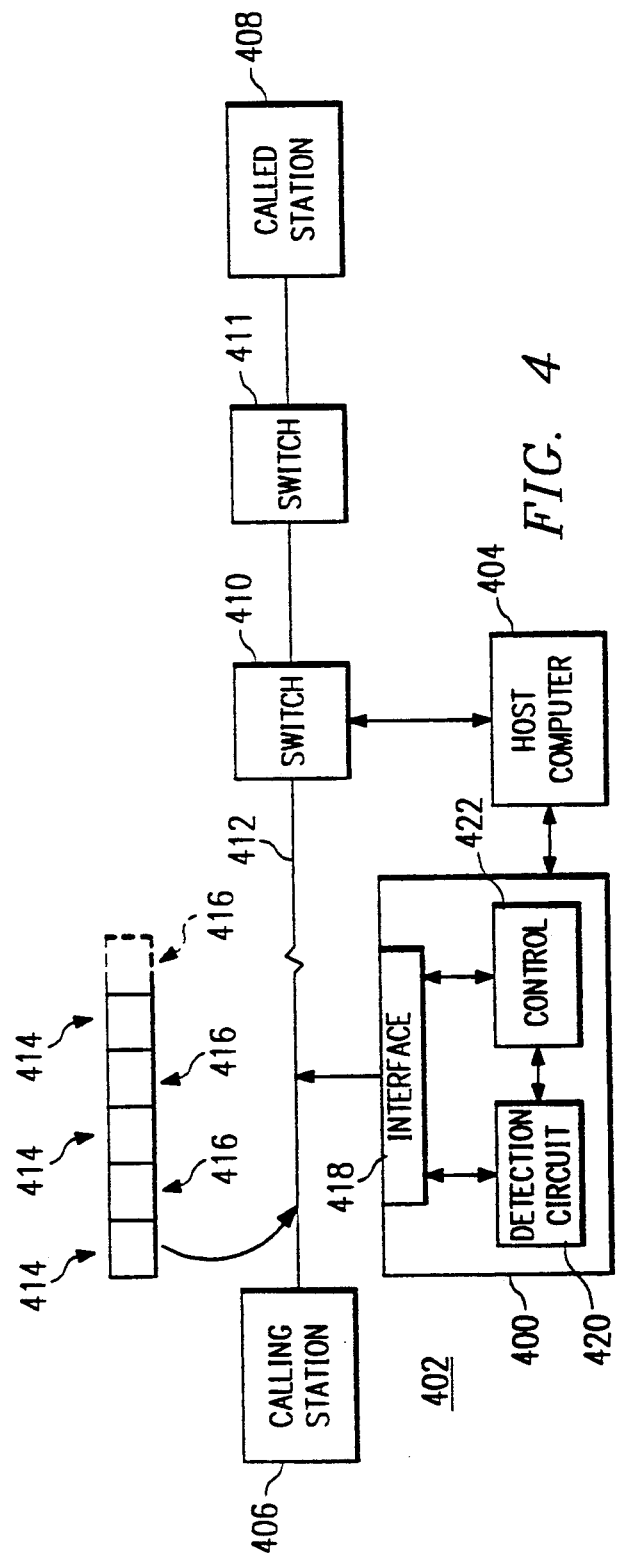
FIG. 4 is an alternative embodiment of the invention wherein an ISDN-type calling station is interconnected to a switch via a digital communications link.

Referring now to FIG. 4, another embodiment of the present invention is shown. In this embodiment, an apparatus 400 is provided for controlling receipt and delivery of voice messages over a telephone system 402 having a host computer 404 connectable to at least one calling station 406 and a called station 408 via switches 410 and 411, the calling station connected to the switch by a digital communication link 412 having at least first and second multiplexed channels 414 and 416 dedicated to the calling station. The host computer 410 is optionally connected to the apparatus 400 for the same reasons previously described with reference to the network applications platform 282 in FIG. 2. Preferably the calling station is an ISDN-type telephone. The apparatus comprises an interface 418 for monitoring call progress signals in the first channel of the digital communication link upon call initiation to the called station by a caller at the calling station, the detection circuit 420 connected to the interface 418 for detecting receipt, during call progress, of a predetermined code from the calling station indicating that the caller desires to leave a voice message for the called station at the caller's expense, and the control arrangement 422 connected through the interface 418 to the detection circuit 420 for connecting the calling station to the switch and the host computer via the second channel 416 of the digital communication link upon detection of the predetermined code to enable the caller to record, at the host computer, a message for the called station.

It is understood that the interface 418 operates to communicate with the digital communications link 412 in a manner consistent with the operation of the digital interface 262a described with reference to FIG. 2 and enables communication on at least the first and second multiplexed channels 414, 416 where the calling station 406 is an ISDN-type telephone. The detection circuit 420 operates in a manner consistent with the operation of the service circuit 276, previously described. The control arrangement 422 performs functions consistent with the processor 266 and the control bus 290 of FIG. 2, as described. According to a departure in the art, the interface 418, the detection circuit 420 and the control arrangement 422 of the apparatus 400 cooperatively enable utilization of the second channel 416 of the ISDN-type telephone to request the voice messaging service.

The functionality of an ISDN-type telephone is well known. This functionality is used to redirect a call in progress to perform a call in progress special service such as automatic message delivery, for example, as follows. The original call is established on the first channel 414 by the calling party at the calling station 406 on the ISDN-type telephone. Communication is initiated with the control 422 by the calling station 406 on the second channel 416 to request that the interface 418 redirect the call in progress through the switch 410 to the host computer 404. The calling station 406 then communicates through the switch 410 with the host computer 404 on the second channel.

According to another feature of the invention, a facsimile (fax) storage and forward method is implemented using the interface shown in FIG. 2. When a call to a fax machine (i.e., the called station) cannot be completed, the system 260 detects a busy/ring-no-answer just like if the call were being directed to a conventional called station. The intercept and redirect begins in the same manner previously described; however, when the calling station fax machine hears no answer (incomplete transmission) it issues a beep tone (or alternative routing instructions in digital coding). In essence, the calling station is thus requesting a response from the called station. When the service circuit 276 detects the beep tone from the calling station, it automatically notifies the processor 266, which then operates to transfer the fax call to the network applications platform 282 for storage and forwarding.

Authorization and acceptance of the fax storage and forward service is effected in one of several ways. First, the called fax station can be connected on a dedicated line such that whenever the system 260 is alerted to a busy/ring-no-answer on that line, the automatic fax delivery (AFD) service is provided. Second, the calling station user can dial the system 260 (i.e., the platform 282 or the T-1 interface) directly and have the autodialer of the calling station fax machine send its dial information directly to the platform 282. Alternatively, the calling station fax machine can be programmed to recognize the system 260, handshake with the system 260 to acknowledge intercept and redirect, and then proceed with facsimile transmission to the platform 282 for subsequent delivery.

The delivery of stored fax messages can be effected using a conventional outdial-to-completion routine; however, typically message delivery would be attempted over shorter intervals (e.g., every five minutes) for a lesser duration than with the AVM service. A confirmation (or inability to deliver) signal is then returned to the original fax machine from the system 260. Alternatively, the platform 282 can be programmed to attempt the delivery at some off-peak time (such as overnight). This operation reduces the congestion of fax machines during peak hours and provides an effective, cost-efficient means of providing message/document delivery without couriers.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. Apparatus for controlling receipt and delivery of voice messages over a telephone system having a host computer connectable to at least one calling station and a called station via a switch means, the calling station connectable to the switch means by a digital communication link having at least first and second channels dedicated to the calling station, comprising:

interface means for monitoring call progress signals in the first channel of the digital communication link upon call initiation to the called station on the first channel by a caller at the calling station;

detection means connected to the interface means for detecting receipt, during call progress, of a predetermined code from the calling station indicating that the caller desires to leave a voice message for the called station at the caller's expense; and control means connected to the detection means for connecting the calling station to the switch means and the host computer via the second channel of the digital communication link upon detection of the predetermined code to enable the caller to record, at the host computer, a message for the called station.

2. In a telephone network having a calling station connectable to a first switch means and a called station connectable to a second switch means, with the first and second switch means connected by digital communication link, the improvement comprising:

an interface unit in a trunk between the calling station and the first switch means for providing intercept and caller-controlled redirect functions associated with automatic voice messaging;

an interface unit in the digital communication link for providing intercept and caller-controlled redirect functions associated with automatic voice messaging;

wherein each of the interface units includes control means responsive to predetermined signaling to determine which of the interface units will provide the intercept and caller-controlled redirect functions upon call initiation to the called station by a caller at the calling station.

3. In the telephone network as described in claim 2, wherein the predetermined signaling is provided in a common channel signaling No. 7 (SS7) protocol.

4. In a telephone network having a calling station connectable to a first switch means and a called station connectable to a second switch means, with the first and second switch means connected by digital communication link, the improvement comprising:

an interface unit in a trunk between the calling station and the first switch means for providing intercept and caller-controlled redirect functions associated with at least one predetermined service;

an interface unit in the digital communication link for providing intercept and caller-controlled redirect functions associated with at least one predetermined service;

wherein each of the interface units includes control means responsive to predetermined signaling to determine which of the interface units will provide the intercept and caller-controlled redirect functions upon call initiation to the called station by a caller at the calling station.

5. In a telephone network having a calling station connectable to a first switch means and a called station connectable to a second switch means, with the first and second switch means connected by digital communication link, the improvement comprising:

at least two interface means connected in the digital communication link each for monitoring signals on the link upon call initiation from the calling station to the called station and for providing intercept and caller-controlled redirect functions associated with a predetermined service;

a database associated with each said interface means; and control means connected to each said interface means and each said database for controlling offer and acceptance of said predetermined service controlled and paid for at the calling station and for redirecting the call to a station other than said called station;

wherein said control means of each said interface means is responsive to predetermined signaling to determine which of the interface means will provide the intercept and caller-controlled redirect functions upon call initiation to the called station by the calling station.

6. In the telephone network as described in claim 5, wherein some of the signals on the link are in the in-band frequency range and some of the signals on the link are in the out-of-band frequency range.

7. In the telephone network as described in claim 5, wherein the signals on the link are in the in-band frequency range.

8. In the telephone network as described in claim 5, wherein the signals on the link are in the out-of-band frequency range.

* * * * *